(12) United States Patent
Wesling et al.

(10) Patent No.: US 10,746,047 B2
(45) Date of Patent: Aug. 18, 2020

(54) STRUCTURE FOR MITIGATING VIBRATORY MODES OF COUNTER-ROTATING ENGINE ROTORS

(71) Applicant: General Electric Company, Schenectady, NY (US)

(72) Inventors: Richard Alan Wesling, Cincinnati, OH (US); Darek Tomasz Zatorski, Fort Wright, KY (US); Gert Johannes van der Merwe, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 15/795,498

(22) Filed: Oct. 27, 2017

(65) Prior Publication Data

US 2019/0128137 A1    May 2, 2019

(51) Int. Cl.
| | |
|---|---|
| F01D 25/06 | (2006.01) |
| F01D 5/26 | (2006.01) |
| F01D 5/03 | (2006.01) |
| F01D 1/26 | (2006.01) |
| F02C 3/067 | (2006.01) |
| F01D 5/10 | (2006.01) |
| F04D 19/02 | (2006.01) |
| F04D 29/32 | (2006.01) |
| F01D 5/06 | (2006.01) |
| F04D 29/66 | (2006.01) |

(52) U.S. Cl.
CPC ............... *F01D 25/06* (2013.01); *F01D 1/26* (2013.01); *F01D 5/03* (2013.01); *F01D 5/06* (2013.01); *F01D 5/10* (2013.01); *F01D 5/26* (2013.01); *F02C 3/067* (2013.01); *F04D 19/024* (2013.01); *F04D 29/321* (2013.01); *F04D 29/668* (2013.01); *F05D 2220/32* (2013.01); *F05D 2260/96* (2013.01)

(58) Field of Classification Search
CPC ... F01D 25/06; F01D 1/26; F01D 5/03; F01D 5/06; F01D 5/10; F01D 5/26
See application file for complete search history.

(56) References Cited

U.S. PATENT DOCUMENTS

| | | | |
|---|---|---|---|
| 4,986,737 A | 1/1991 | Erdmann | |
| 5,074,109 A | 12/1991 | Mandet et al. | |
| (Continued) | | | |

FOREIGN PATENT DOCUMENTS

| | | |
|---|---|---|
| JP | H02238102 A | 9/1990 |
| JP | H04228805 A | 8/1992 |
| (Continued) | | |

OTHER PUBLICATIONS

European Search Report Corresponding to Application No. 18201955 dated Jan. 25, 2019.

(Continued)

*Primary Examiner* — Kayla Mccaffrey
*Assistant Examiner* — John S Hunter, Jr.
(74) *Attorney, Agent, or Firm* — Dority & Manning, P.A.

(57) ABSTRACT

A gas turbine engine including a first rotor assembly is generally provided. The first rotor assembly includes outer drum and an outer drum airfoil. The outer drum airfoil is coupled to the outer drum and extended inward along a radial direction. A damper structure is coupled to one or more of the outer drum or the outer drum airfoil.

20 Claims, 5 Drawing Sheets

(56) References Cited

U.S. PATENT DOCUMENTS

| | | | |
|---|---|---|---|
| 5,131,813 A | 7/1992 | Prytulski et al. | |
| 5,961,067 A * | 10/1999 | Hall et al. | |
| 8,011,877 B2 * | 9/2011 | Schilling | F01D 5/03 |
| | | | 415/91 |
| 8,403,643 B2 | 3/2013 | Welsh | |
| 8,695,917 B2 | 4/2014 | Cranga et al. | |
| 8,747,055 B2 | 6/2014 | McCune et al. | |
| 9,028,200 B2 | 5/2015 | Suciu et al. | |
| 9,080,512 B2 | 7/2015 | Suciu et al. | |
| 9,145,847 B2 | 9/2015 | Gallet et al. | |
| 9,228,449 B2 | 1/2016 | Cloaree | |
| 9,765,625 B2 * | 9/2017 | Stiehler | F01D 5/10 |

FOREIGN PATENT DOCUMENTS

| | | | |
|---|---|---|---|
| JP | 2010/121624 A | 6/2010 | |
| JP | 2013/528746 A | 7/2013 | |
| JP | 2013/253522 A | 12/2013 | |

OTHER PUBLICATIONS

Canadian Office Action Corresponding to Application No. 3021302 dated Nov. 6, 2019.
Machine Translated Japanese Office Action Corresponding to Application No. 2018199808 dated Dec. 3, 2019.

* cited by examiner

STRUCTURE FOR MITIGATING VIBRATORY MODES OF COUNTER-ROTATING ENGINE ROTORS

FIELD

The present subject matter relates generally to structures for mitigating vibratory modes of counter-rotating turbine engines.

BACKGROUND

As gas turbine engine designers and manufacturers seek to increase engine performance and efficiency, one known solution is to incorporate a counter-rotating turbine. However, counter-rotating turbines generally excite or increase vibratory modes due to the sum of the inner and outer rotor speed. Additionally, relatively larger diameters and small radial depths of overhanging or cantilevered shrouds of counter-rotating turbine engines may define relatively low natural frequencies or low order vibratory modes, thus limiting engine speeds and/or subjecting the engine to undesired vibratory modes.

Known counter-rotating turbine engines adversely offset efficiency and performance improvements of a counter-rotating arrangement with larger and/or heavier structures to mitigate certain vibratory modes. Thus, there is a need for structures that mitigate certain vibratory modes of counter-rotating turbine engines.

BRIEF DESCRIPTION

Aspects and advantages of the invention will be set forth in part in the following description, or may be obvious from the description, or may be learned through practice of the invention.

The present disclosure is generally directed to a gas turbine engine including a first rotor assembly. The first rotor assembly includes outer drum and an outer drum airfoil. The outer drum airfoil is coupled to the outer drum and extended inward along a radial direction. A damper structure is coupled to one or more of the outer drum or the outer drum airfoil.

In various embodiments, the damper structure defines a substantially annular ring, the annular ring defining springing properties generating an outward force along the radial direction. In one embodiment, the damper structure defines an axial split through the annular ring such as to define a first end and a second end of the damper structure. In another embodiment, the damper structure defines a first portion extended generally co-directional to a portion of the outer drum or the outer drum airfoil to which the damper structure is coupled. In yet another embodiment, the damper structure defines one or more radii at the first portion extended at least partially inward along the radial direction, wherein the one or more radii enable springing of the damper structure in response to an axial load onto the damper structure.

In still various embodiments, the damper structure is disposed at an inner radius of the outer drum. In one embodiment, the damper structure is disposed outward along the radial direction of the outer drum airfoil. In another embodiment, the outer drum airfoil defines an arm extended at least partially along the radial direction and a longitudinal direction. The outer drum defines a hanger defining a hanger groove into which the arm of the outer drum airfoil is disposed, the arm and the hanger coupling the outer drum airfoil to the outer drum. In yet another embodiment, the damper structure is coupled to the outer drum and two or more arms of the outer drum airfoil.

In various embodiments, the damper structure is disposed at an inner radius of the outer drum airfoil. In one embodiment, the outer drum airfoil defines a platform extended at least partially along a longitudinal direction. The inner radius of the outer drum airfoil is defined at the platform. The damper structure is disposed at the platform of the outer drum airfoil.

In still yet various embodiments, the gas turbine engine further includes a second rotor assembly. The second rotor assembly includes a second airfoil disposed inward along the radial direction of the outer drum of the first rotor assembly. The damper structure is disposed on the outer drum of the first rotor assembly outward of the second airfoil along the radial direction. In one embodiment, the first rotor assembly and the second rotor assembly are each rotatable about an axial centerline of the engine. The first rotor assembly and the second rotor assembly are in counter-rotating arrangement. In another embodiment, the first rotor assembly and the second rotor assembly are in alternating arrangement along the longitudinal direction. In still another embodiment, the first rotor assembly is disposed upstream of the second rotor assembly.

In one embodiment, the damper structure is disposed approximately at an anti-node of the first rotor assembly.

In another embodiment, the outer drum defines a groove through an inner radius of the outer drum. The damper structure is disposed within the groove at the outer drum.

In still another embodiment, the damper structure is disposed in a compressor section of the engine, in a turbine section of the engine, or both.

In one embodiment, the first rotor assembly further includes a rotatable torque frame to which the outer drum is coupled. The rotatable torque frame enables rotation of the outer drum of the first rotor assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low", "high", or their respective comparative degrees (e.g. -er, where applicable) each refer to relative speeds within an engine, unless otherwise specified. For example, a "low turbine" or "low speed turbine" defines a rotational speed generally lower than a "high turbine" or "high speed turbine". Alternatively, unless otherwise specified, the aforementioned terms may be understood in their superlative degree. For example, a "low turbine" may refer to the lowest maximum rotational speed turbine within a turbine section, and a "high turbine" may refer to the highest maximum rotational speed turbine within the turbine section. As used herein, "high turbine" or "high speed turbine" generally refers to one or more turbine rotors defining a higher maximum rotational speed than the low turbine or low speed turbine. Still further, reference to the "high turbine" may include a plurality thereof, each defining one or more maximum rotational speeds separate or independent from one another and greater than a maximum rotational speed of the low speed turbine.

Embodiments of a damper structure are generally provided herein that may mitigate certain vibratory modes of counter-rotating turbine engines. The embodiments generally shown and described herein may be applied to an interdigitated turbine or compressor section such as to decrease certain vibratory modes (e.g., low order vibrations). The embodiments of the damper structure generally provided may enable interdigitation, or further extend interdigitation, of a first rotor assembly among one or more second rotor assemblies. The damper structure may further enable extending an overhang or cantilever of an outer drum or shroud of the first rotor assembly over one or more second rotor assemblies. Such interdigitation enables increased gas turbine engine efficiency, improved performance, decreased fuel burn, and improved operability of the engine at higher rotational speeds.

An interdigitated compressor or turbine section may increase fuel efficiency, operational efficiency, and/or power output while reducing weight, part count, and/or packaging (e.g. radial and/or axial dimensions). For example, the interdigitated compressor or turbine section may enable increased bypass ratio and/or overall pressure ratio of the gas turbine engine, thereby increasing fuel efficiency, operational efficiency, and/or power output relative to other engines of similar power output and/or packaging. The interdigitated compressor or turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") while additionally reducing an average work factor per stage of the turbine section.

Figure 1:
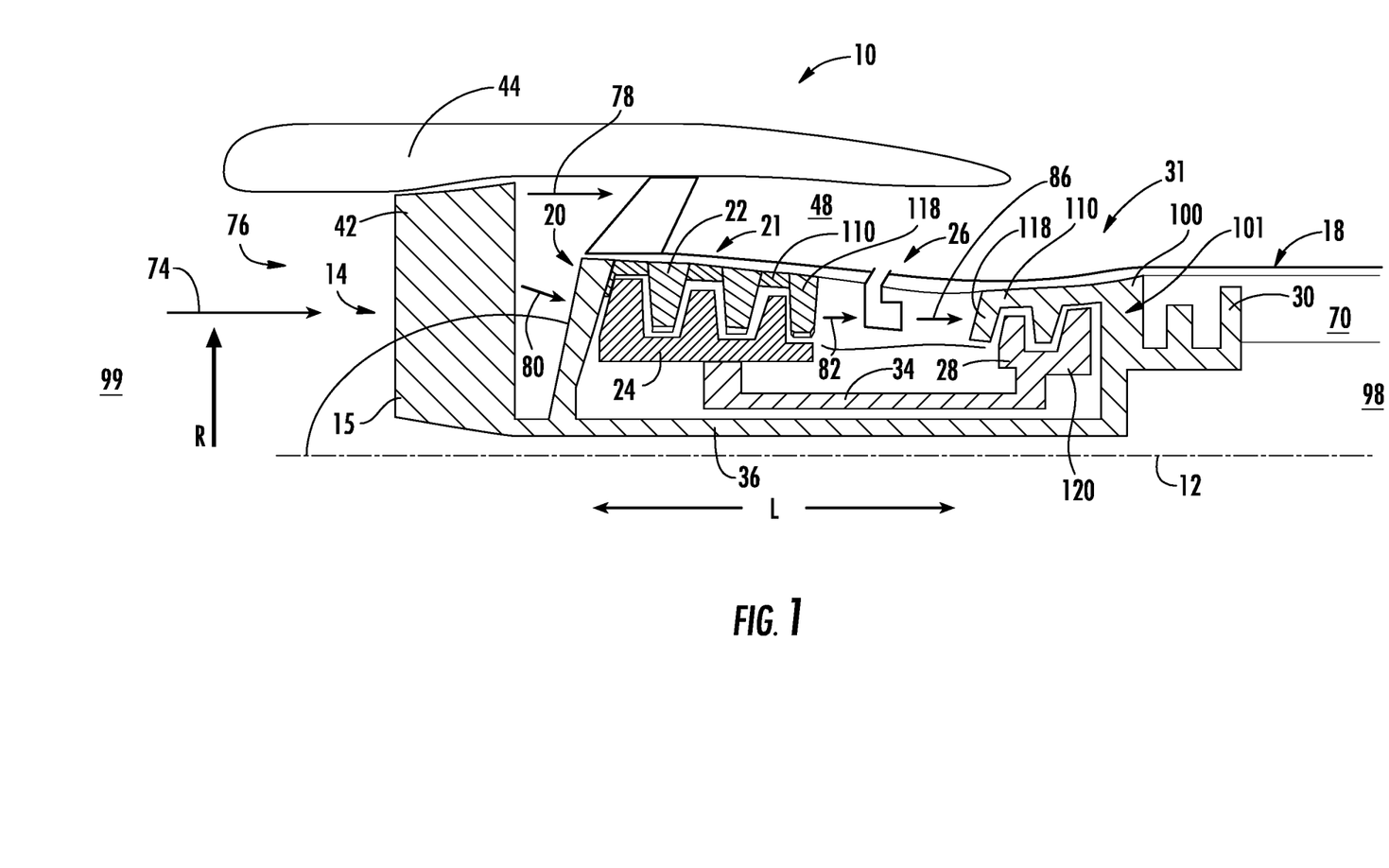
FIG. 1 is a schematic cross sectional view of an exemplary gas turbine engine incorporating an exemplary embodiment of a turbine section according to an aspect of the present disclosure.
Figure 2:
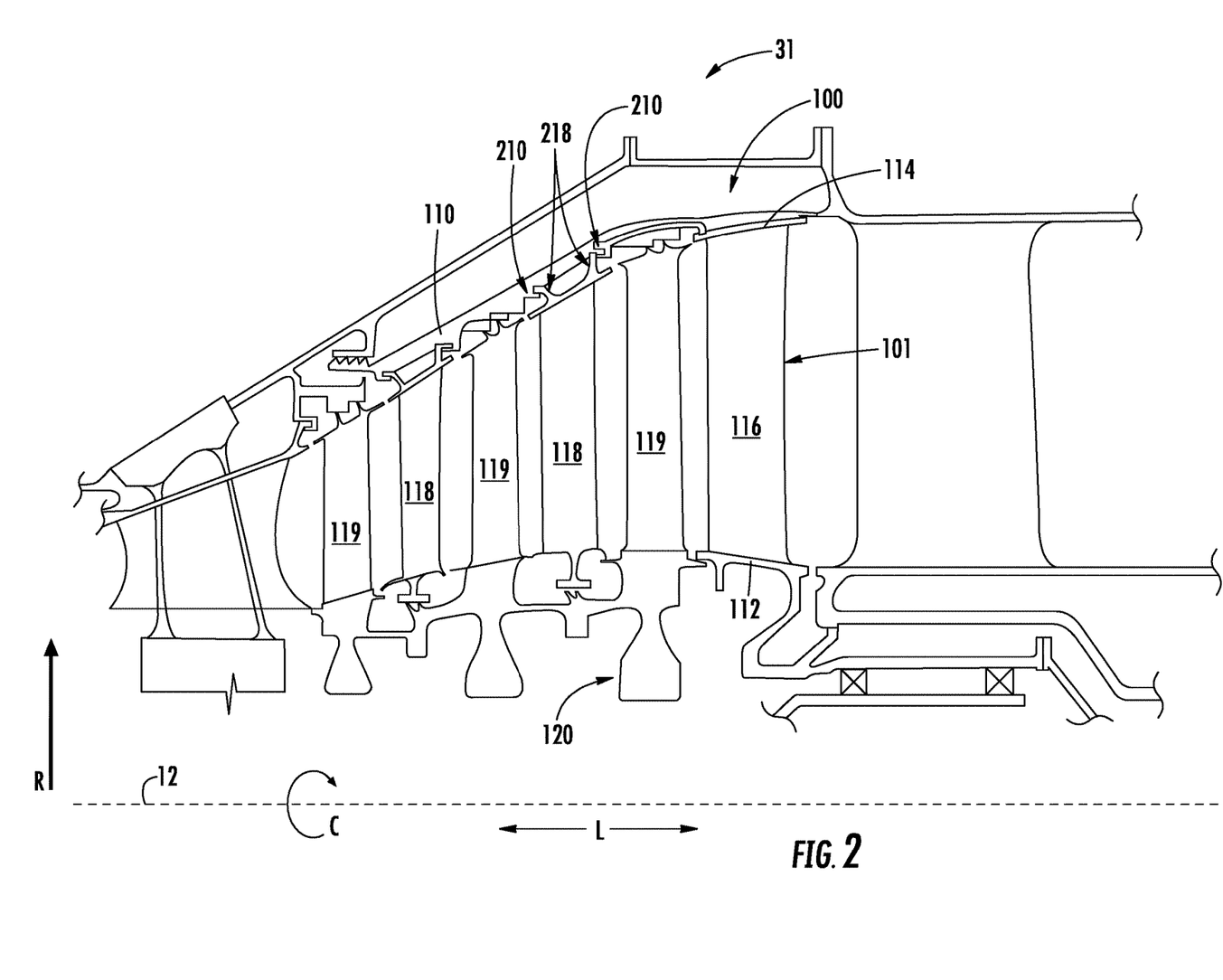
FIG. 2 is a schematic cross sectional view of an exemplary embodiment of a turbine section according to an aspect of the present disclosure of the gas turbine engine generally provided in FIG. 1.
Figure 5:
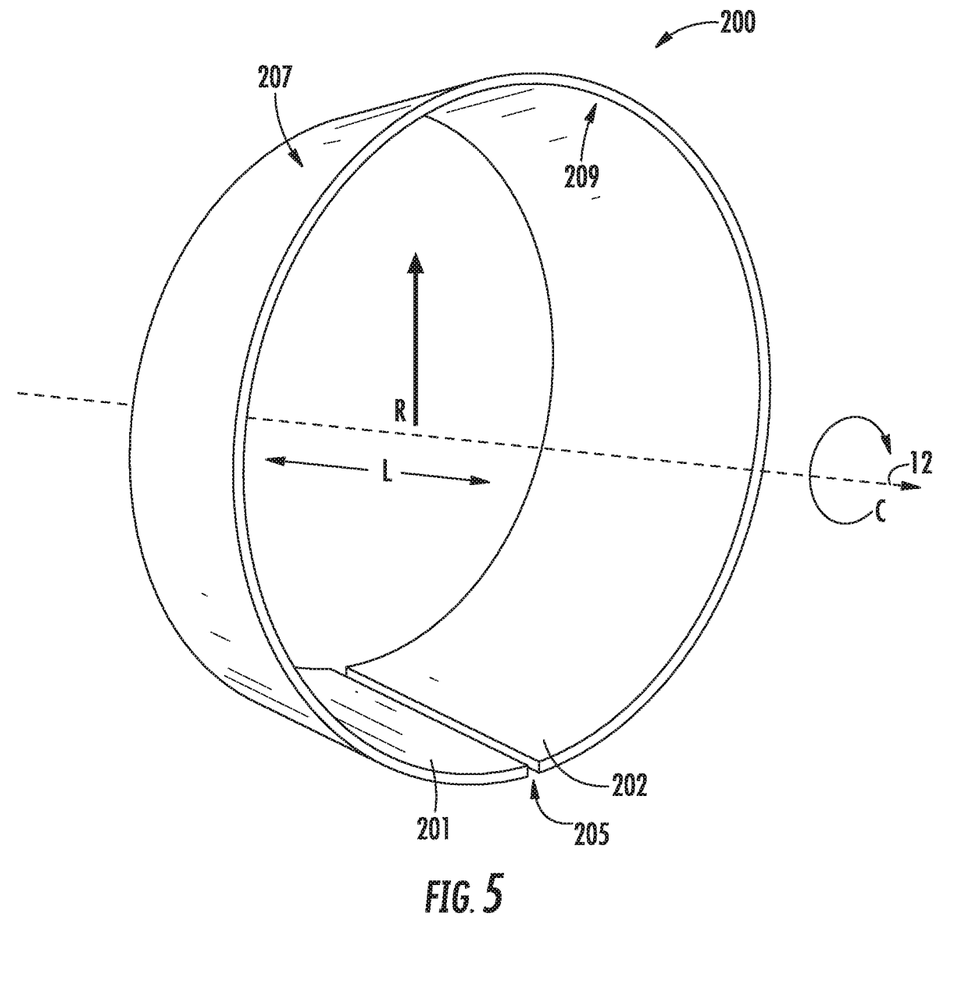
FIG. 5 is a perspective view of an exemplary embodiment of a structure for mitigating vibratory modes of counter rotating engine rotors.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 31 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, an upstream end 99 and a downstream end 98 along the longitudinal direction L, and a circumferential direction C (FIGS. 2 and 5).

In general, the engine 10 may include a substantially tubular outer casing 18 that defines an annular inlet 20. The outer casing 18 encases or at least partially flows, in serial flow arrangement along the longitudinal direction L, a compressor section 21, a combustion section 26, and a turbine section 31. A fan assembly 14 is disposed generally forward or upstream 99 of the compressor section 21. In the embodiment shown in FIG. 1, the engine 10 defines a two-spool configuration in which the compressor section 21 includes a first compressor 22 and a second compressor 24 in alternating or interdigitated arrangement along the longitudinal direction L. The fan assembly 14 and the first compressor 22 are coupled to a first shaft 36 toward the upstream end 99 of the engine 10 and a first rotor assembly 100 is coupled to the first shaft 36 toward the downstream end 98 of the engine 10. The first compressor 22 and fan assembly 14 are driven by the first rotor assembly 100. The second compressor 24 is coupled to a second shaft 34 and a second rotor 120 is coupled to the second shaft 34 toward the downstream end 98 of the engine 10. The second compressor 24 is driven by the second rotor 120. In various embodiments, the first compressor 22 defines a low pressure (LP) compressor and the second compressor 24 defines a high pressure (HP) compressor. In still various embodiments, the first rotor assembly 100 may define a low speed turbine 30 and the second rotor 120 may define a high speed turbine 28.

In other embodiments, the engine 10 may define a three-spool configuration in which the compressor section 21 defines a fan assembly 14 including a fan rotor 15, and the first compressor 22 and the second compressor 24. Another higher speed turbine rotor (relative to the first rotor assembly 100), such as defining a third turbine rotor, may define an intermediate speed turbine driving the first compressor defining an intermediate pressure (IP) compressor. The first rotor assembly 100 defining the low speed turbine 30 is attached to the fan rotor 15, thus driving the fan assembly 14. In such an embodiment, and in regard to depictions of the turbine section 31 generally provided in regard to FIGS. 1-4, the third turbine rotor may be represented generally by, or interchanged with, the second rotor assembly 120 disposed in interdigitation among the first rotor assembly 100.

Referring back to FIG. 1, the fan assembly 14 includes at least one stage of a plurality of fan blades 42 coupled to the fan rotor 15. The plurality of fan blades 42 are coupled to and extend outwardly from the fan rotor 15 in the radial direction R. In various embodiments, the fan rotor 15 may include a plurality of stages of fan blades 42 along the longitudinal direction L. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

In other embodiments, the fan assembly 14 may further include a speed reduction assembly disposed between the fan rotor 15 and a first shaft 36 coupled to the turbine section 31. The speed reduction assembly may reduce the rotational speed of the fan rotor 15 relative to the turbine rotor of the turbine section 31 to which the fan rotor 15 is attached via the first shaft 36.

Referring now to FIGS. 1-5, during operation of the engine 10 a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed through the fan assembly 14 and through the inlet 20. The air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 31, causing the first rotor assembly 100 and second rotor assembly 120 of the turbine section 31 to rotate and support operation of respectively coupled rotary members in the compressor section 21 and/or fan assembly 14.

Referring now to FIG. 2, an exemplary embodiment of the turbine section 31 of the engine 10 is generally provided. The turbine section 31 includes the first rotor assembly 100 and the second rotor 120 in alternating arrangement along the longitudinal direction L (i.e., interdigitated). The first rotor assembly 100 includes an annular outer drum 110 extended along the circumferential direction around the axial centerline 12. The outer drum 110 is extended along the longitudinal direction L and at least partially surrounds the second rotor 120. The second rotor assembly 120 includes a second airfoil 119 disposed inward along the radial direction R of the outer drum 110 of the first rotor assembly 100. In various embodiments, the first rotor assembly 100 and the second rotor assembly 120 are each rotatable about the axial centerline 12 of the engine 10. The first rotor assembly 100 and the second rotor assembly 120 are in counter-rotating arrangement (i.e., rotating in opposite directions around the axial centerline 12 relative to one another). However, it should be appreciated that in other embodiments, the first turbine rotor 100 and the second turbine rotor 120 could be in co-rotating arrangement (i.e., rotating in the same direction around the axial centerline 12).

The first rotor assembly 100 further includes a rotatable torque frame 101. The torque frame 101 defines a generally annular structure rotatable about the axial centerline 12. The torque frame 101 includes an outer ring 114, an inner ring 112, and a structural member 116 extended generally along the radial direction R and coupled to the outer ring 114 and the inner ring 112. Each of the outer ring 114 and the inner ring 112 are generally concentric relative to one another. The outer ring 114 and the inner ring 112 are further concentric relative to the axial centerline 12. The structural members 116 transfer radial and circumferential loads along the inner ring 112 to the outer ring 114.

In various embodiments, the structural members 116 define a generally perpendicular, acute, or obtuse lean angle relative to the axial centerline 12. The structural members 116 generally provide support relative to an axial load, such as generated by combustion gases 86 from the combustion section 26. The torque frame 101 is further configured to extract work or energy from the combustion gases 86 such as to enable rotation of the first rotor assembly 100 including the torque frame 101 and the outer drum 110. As such, in various embodiments, the structural members 116 of the torque frame 101 may further define an airfoil, such as including a pressure side, a suction side, a leading edge, and a trailing edge, such as to efficiently and effectively extract energy from the combustion gases 86 to induce rotation of the first rotor assembly 100.

Referring still to FIG. 2, the first rotor assembly 100 further includes an outer drum airfoil 118 coupled to the outer drum 110 and extended inward along the radial direction R. As generally provided in the exemplary embodiment shown in FIG. 2, and shown in further detail in FIG. 3, the outer drum airfoil 118 defines an arm 218 extended at least partially along the radial direction R and the longitudinal direction L. The outer drum 110 defines a hanger 210 extended as a member at least partially along the longitudinal direction L and at least partially along the circumferential direction C. The hanger 210 defines a hanger groove 211 into which the arm 218 of the outer drum airfoil 118 is disposed. The arm 218 and the hanger 210 couple the outer drum airfoil 118 to the outer drum 110. For example, the arm 218 and hanger 210 generally provide support and retention for the outer drum airfoils 118 along the radial direction R, the longitudinal direction L, and the circumferential direction C. In various embodiments, the outer drum airfoil 118 defines a plurality of airfoils in adjacent circumferential arrangement disposed within the hanger groove 211.

Figure 3:
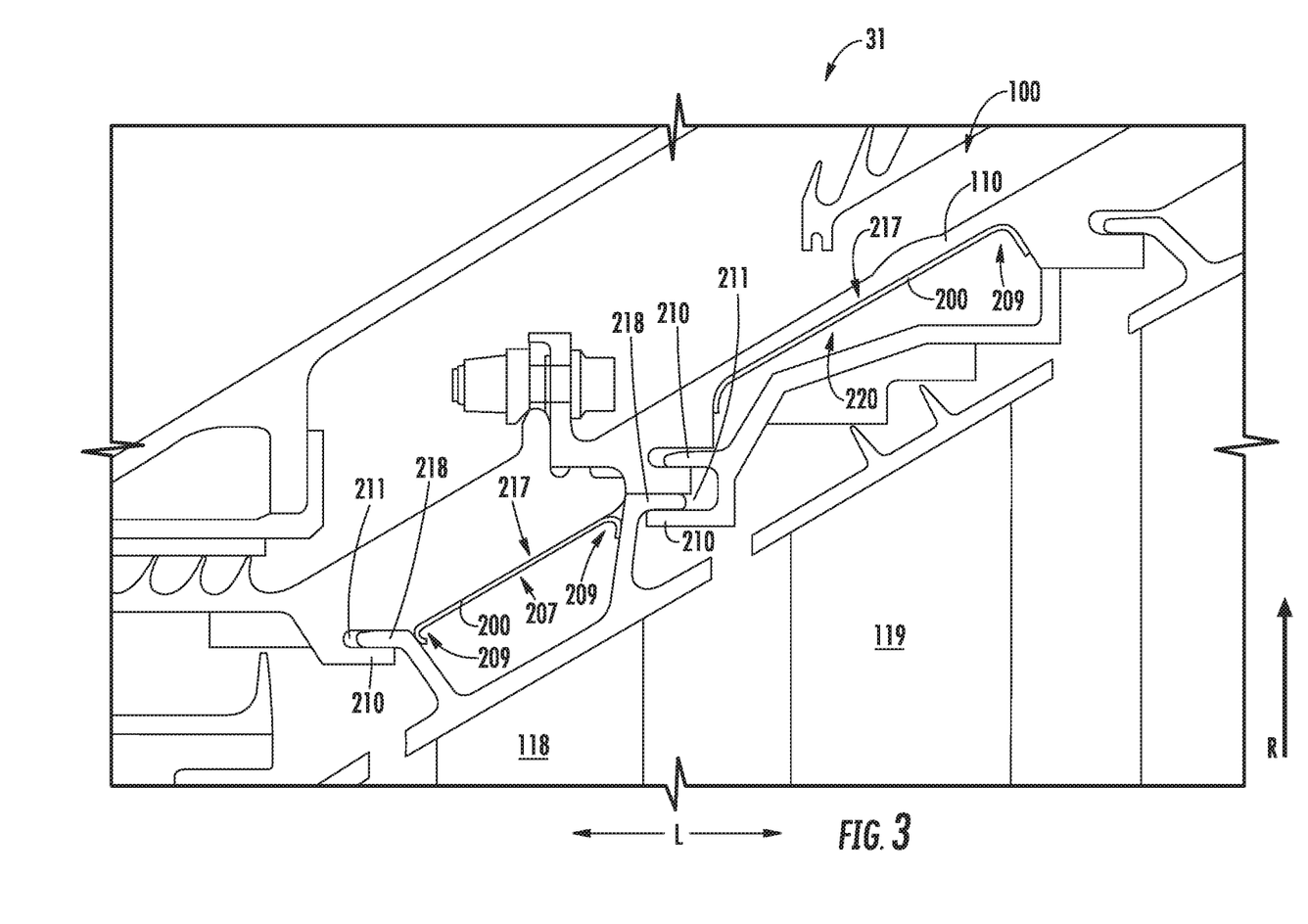
FIG. 3 is a cross sectional view of a portion of the exemplary embodiment of the turbine section generally provided in FIG. 2.
Figure 4:
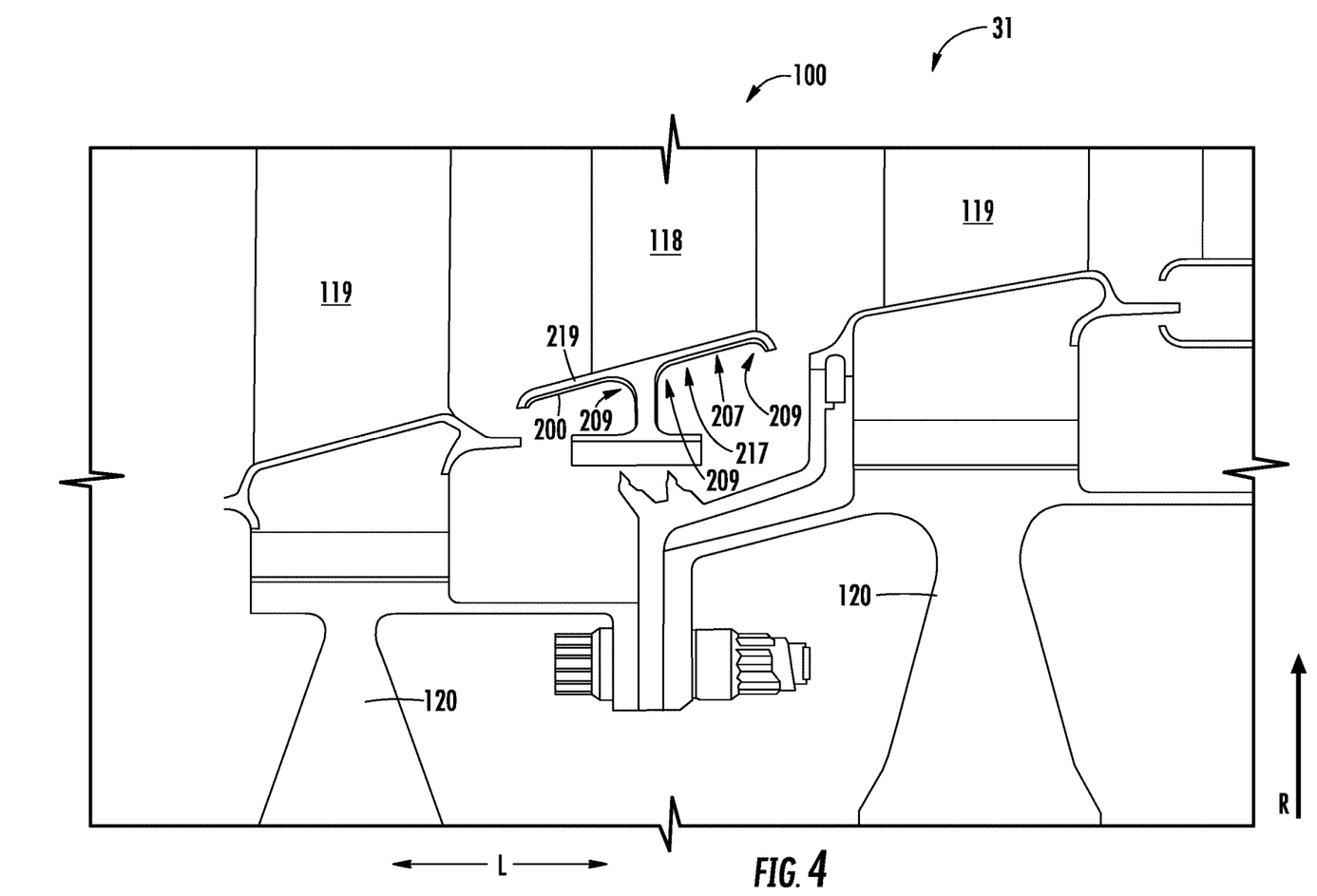
FIG. 4 is a cross sectional view of another portion of the exemplary embodiment of the turbine section generally provided in FIG. 2.

Referring now to the exemplary embodiment of the portion of the turbine section 31 generally provided in FIG. 3, the first rotor assembly 100 further includes a damper structure 200 coupled to one or more of the outer drum 110 and the outer drum airfoil 118. Referring briefly to FIG. 5, an exemplary embodiment of the damper structure 200 is generally provided. Referring to FIGS. 3-5, in various embodiments, the damper structure 200 defines a substantially annular ring. The annular ring defines springing properties generating an outward force along the radial direction R. For example, the damper structure 200 is generally mechanically sprung such as to at least partially clamp or wrap onto the adjacent outer drum 110, the outer drum airfoils 118, or both.

Referring now to FIG. 5, the damper structure 200 may define an axial split 205 through the annular ring such as to define a first end 201 and a second end 202 of the damper structure 200. The axial spit 205 through the damper structure 200 may generally enable the damper structure 200 to expand and contract along the radial direction R. In various embodiments, the damper structure 200 defines a first portion 207 extended at least partially along the longitudinal direction L. As generally shown in FIGS. 3-4, the first portion 207 of the damper structure 200 is generally co-directional to a portion of the outer drum 110 (FIG. 3) or the outer drum airfoil 118 (FIG. 4) to which the damper structure 200 is coupled.

Referring still to FIGS. 3-4, in various embodiments, the damper structure 200 defines one or more radii 209 at the first portion 207. In one embodiment, such as generally provided in FIG. 3, the radii 209 of the damper structure 200 is extended at least partially co-directional to the arm 218 of the outer drum airfoil 118. For example, the radii 209 of the damper structure 200 may generally extend from the first portion 207 inward along the radial direction R. As such, the damper structure 200 may couple or interface to an inner radius 217 of the outer drum 110. Still further, the damper structure 200 may generally be disposed outward along the radial direction R of the outer drum airfoil 118. For example, the damper structure 200 may couple or interface to the outer drum airfoil 118 such as adjacent to the arm 218 of the outer drum airfoil 118. Additionally, or alternatively, the damper structure 200 may couple or interface to the outer drum 110 and two or more arms 218 of the outer drum airfoil 118.

Referring still to FIG. 3, the outer drum 110 may define a groove 220 extended along the circumferential direction C along an inner radius 217. The groove 220 through the outer drum 110 may generally be defined outward along the radial direction R from the adjacent the second airfoils 119 of the second rotor 120.

In another embodiment, such as the exemplary embodiment provided in FIG. 4, the outer drum airfoil 118 defines an inner radius 217 at which the damper structure 200 may be disposed. For example, the outer drum airfoil 118 may generally define a platform 219 extended at least partially along the longitudinal direction L. The inner radius 217 of the outer drum airfoil 118 is defined at the platform 219. The damper structure 200 may be disposed at the platform 219 of the outer drum airfoil 118. More specifically, the damper structure 200 may be coupled to or interfacing at the inner radius 217 of the outer drum airfoil 118 at the platform 219.

As generally provided in FIGS. 3-4, the one or more radii 209 of the damper structure 200 enable springing of the damper structure 200 in response to an axial or longitudinal load onto the damper structure 200. As a non-limiting example, the longitudinal load may result from thermal expansion of the outer drum airfoils 118. As another non-limiting example, the longitudinal load may result from circumferential or tangential loads, or radial loads, induced on the outer drum 110, the arms 218 of the outer drum airfoils 118, or both, such as to push the arms 218 of the outer drum 118 toward one another, thereby applying a longitudinal load onto the damper structure 200. The radii 209 of the damper structure 200 may provide springing properties such that the first portion 207 of the damper structure 200 may generally react against the inner radius 217 of the outer drum 110 (FIG. 3) or the outer drum airfoil 118 (FIG. 4) when a generally longitudinal load is exerted at the radii 209 of the damper structure 200.

In yet another embodiment, the damper structure 200 is generally disposed approximately at an anti-node of the first rotor assembly 100. The anti-node is one or more points along a standing wave of the first rotor assembly 100 defines an approximately maximum amplitude. The anti-node may more specifically be one or more points along a standing wave defined by the outer drum 110 of the first rotor assembly 100. In one embodiment, the anti-node may be defined approximately at one or more grooves 220 defined in the outer drum 110. In various embodiments, the first rotor assembly 100 may define a fixed boundary approximately at the torque frame 101. The torque frame 101 may be disposed toward an upstream end 99 or a downstream end 98, such as to define a generally overhung or cantilevered outer drum 110. In another embodiment, the torque frame 101 may additional be disposed at the upstream end 99 and the downstream end 98, or therebetween, of the first rotor assembly 100, such as to define a plurality of fixed boundaries of the first rotor assembly 100. In other embodiments, the first rotor assembly 100 may define another fixed boundary approximately at one or more bearing assemblies opposite of the torque frame 101 along the longitudinal direction L (i.e., supporting the first rotor assembly 100 at an upstream end 99 and a downstream end 98 along the longitudinal direction L).

Although the first rotor assembly 100 and the second rotor assembly 120 are depicted in FIGS. 1-4 as portions of the turbine section 31, it should be appreciated that their various embodiments described herein may further apply to an interdigitated compressor section 21, such as generally shown in FIG. 1. For example, in one embodiment, the first compressor 22 includes the outer drum 110 disposing the plurality of outer drum airfoils 118 in alternating arrangement with the second compressor 24. The embodiments of the damper structure 200 generally shown and described in regard to FIGS. 1-5 may be applied to an interdigitated compressor section 21.

In regard to the embodiments of the damper structure 200 generally shown and described herein as a portion of the turbine section 31, the embodiments generally provided herein may improve upon existing interdigitated or counter-rotating turbine sections by enabling improved fuel efficiency, operational efficiency, and/or power output while maintaining or reducing weight, part count, and/or packaging. The plurality of outer drum airfoils 118 of the first rotor assembly 100 interdigitated among the plurality of second airfoils 119 of the second rotor assemblies 120 may reduce packaging (e.g., longitudinal and/or radial dimensions) and reduce part count by removing stages of stationary airfoils between each rotating component.

The damper structure 200 disposed at the first rotor assembly 100 may enable overhanging or cantilevering the first rotor assembly 100 forward or upstream of the second rotor assembly 120, or more specifically, upstream of all stages of the second rotor assembly 120, such as to dispose the first rotor assembly 100, or more specifically, the outer drum airfoils 118, as the first stage downstream of the combustion section 26 (e.g., obviating or removing a stationary turbine nozzle or vane between the combustion section 26 and the rotating components of the turbine section 31). Such an arrangement may further improve engine efficiency by reducing cooling air appropriated away from producing combustion gases 86, thereby allowing more energy from the compressor section 21 to be utilized in combustion and operation of the engine 10. Furthermore, removing the turbine nozzle between the combustion section 26 and the turbine section 31 may reduce or eliminate design constraints related to hot spots in the combustion gases along the annulus of the core flowpath 70. As such, the engine 10 described herein may remove constraints to combustion section 26 design by de-emphasizing hot spots, or combustion pattern factor, in favor of other design criteria, such as decreasing emissions, improving lean blow-out (LBO) and/or altitude re-light, improving overall operability across part or all of an operating envelope, or increasing the operating envelope.

The various embodiments of the turbine section 31 generally shown and described herein may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 31, or portions or combinations of portions thereof, may be formed using additive manufacturing or 3D printing, or casting, forging, machining, or castings formed of 3D printed molds, or combinations thereof. The turbine section 31, or portions thereof, may be mechanically joined using fasteners, such as nuts, bolts, screws, pins, or rivets, or using joining methods, such as welding, brazing, bonding, friction or diffusion bonding, etc., or combinations of fasteners and/or joining methods. Still further, it should be understood that the first rotor assembly 100 and the second rotor assembly 120 may incorporate features that allow for differential expansion.

The damper structure 200 may further be constructed of one or more materials, such as a sheet metal, appropriate for temperatures, pressures, flows, and operating conditions at which the damper structure 200 is disposed, such as at the turbine section 31 or the compressor section 21.

The various embodiments of the damper structure 200 generally shown in FIGS. 1-5 and described herein may provide structures for reducing low order vibratory modes of an interdigitated rotor structure, such as an interdigitated turbine section 31 or compressor section 21, that may thereby decrease fuel consumption, increase operability, increase engine performance and/or power output while maintaining or reducing weight, part count, and/or packaging (e.g. radial and/or axial dimensions). The embodiments provided herein may allow for increased high bypass ratios and/or overall pressure ratios over existing gas turbine engine configurations, such as turbofans, while maintaining or reducing packaging relative to other gas turbine engines of similar power output. The embodiments described herein may contribute to improved bypass ratio and/or overall pressure ratio and thereby increase overall gas turbine engine efficiency.

Still further, the embodiments of the damper structure 200 shown in FIGS. 1-5 and described herein may enable extending interdigitation of the first rotor assembly 100 and the second rotor assembly 120 such as by attenuating vibratory modes and thereby enabling an extension of an overhang or cantilever of the outer drum 110 and the outer drum airfoils 118 such as to reduce a product of a flow area and the square of the rotational speed (the product herein referred to as "$AN^2$") of the gas turbine engine. For example, engine 10 shown and described in regard to FIGS. 1-15 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 31 (compared to engines of similar thrust output and packaging) by interdigitating the first rotor assembly 100 defining a low speed turbine among the one or more stages of the second rotor assembly 120 defining a high speed turbine. Therefore, the first rotor assembly 100 may increase the quantity of rotating stages of airfoils while reducing the average stage work factor, and therefore the $AN^2$, while mitigating increases in axial length to produce a similar $AN^2$ value. The first rotor assembly 100 may further reduce the $AN^2$ while additionally reducing the overall quantity of airfoils, rotating and stationary, in the turbine section 31 relative to turbine sections of gas turbine engines of similar power output and/or packaging.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
a first rotor assembly comprising an outer drum and an outer drum airfoil, wherein the outer drum airfoil is coupled to the outer drum and extended inward along a radial direction, and further comprising a damper structure coupled to one or more of the outer drum or the outer drum airfoil, the damper structure comprising a discontinuous ring, the discontinuous ring comprising a spring configured to generate an outward force along the radial direction during at least an assembled state.

2. The gas turbine engine of claim 1, wherein the damper structure comprises an annular ring, the annular ring forming discontinuous ring forming the spring configured to generate the outward force along the radial direction.

3. The gas turbine engine of claim 2, wherein the damper structure comprises an axial split through the annular ring such as to form a first end and a second end of the damper structure.

4. The gas turbine engine of claim 2, wherein the damper structure comprises a first portion extended co-directional to a portion of the outer drum or the outer drum airfoil to which the damper structure is coupled.

5. The gas turbine engine of claim 4, wherein the damper structure comprises one or more radii at the first portion extended at least partially inward along the radial direction, wherein the one or more radii provide springing of the damper structure in response to an axial load onto the damper structure.

6. The gas turbine engine of claim 1, wherein the damper structure is disposed at an inner radius of the outer drum.

7. The gas turbine engine of claim 6, wherein the damper structure is disposed outward along the radial direction of the outer drum airfoil.

8. The gas turbine engine of claim 7, wherein the outer drum airfoil comprises an arm extended at least partially along the radial direction and a longitudinal direction, and wherein the outer drum comprises a hanger, the hanger comprising a hanger groove into which the arm of the outer drum airfoil is disposed, the arm and the hanger coupling the outer drum airfoil to the outer drum.

9. The gas turbine engine of claim 8, wherein the damper structure is coupled to the outer drum and two or more of the arms of the outer drum airfoil.

10. The gas turbine engine of claim 1, wherein the damper structure is disposed at an inner radius of the outer drum airfoil.

11. The gas turbine engine of claim 10, wherein the outer drum airfoil comprises a platform extended at least partially along a longitudinal direction, and wherein the inner radius of the outer drum airfoil is positioned at the platform, and further wherein the damper structure is disposed at the platform of the outer drum airfoil.

12. The gas turbine engine of claim 1, comprising:
a second rotor assembly comprising a second airfoil disposed inward along the radial direction of the outer drum of the first rotor assembly, wherein the damper structure is disposed on the outer drum of the first rotor assembly outward of the second airfoil along the radial direction.

13. The gas turbine engine of claim 12, wherein the first rotor assembly and the second rotor assembly are each rotatable about an axial centerline of the gas turbine engine, and wherein the first rotor assembly and the second rotor assembly are in counter-rotating arrangement.

14. The gas turbine engine of claim 12, wherein the first rotor assembly and the second rotor assembly are in alternating arrangement along a longitudinal direction.

15. The gas turbine engine of claim 12, wherein the first rotor assembly is disposed upstream of the second rotor assembly.

16. The gas turbine engine of claim 1, wherein the damper structure is disposed approximately at an anti-node of the first rotor assembly.

17. The gas turbine engine of claim 1, wherein the outer drum comprises a groove through an inner radius of the outer drum, and wherein the damper structure is disposed within the groove at the outer drum.

18. The gas turbine engine of claim 1, wherein the damper structure is disposed in a compressor section of the gas turbine engine.

19. The gas turbine engine of claim 1, wherein the damper structure is disposed in a turbine section of the gas turbine engine.

20. The gas turbine engine of claim 1, wherein the first rotor assembly comprises a rotatable torque frame to which the outer drum is coupled, the rotatable torque frame providing rotation of the outer drum of the first rotor assembly.

* * * * *